United States Patent
Norman et al.

(10) Patent No.: US 7,546,570 B2
(45) Date of Patent: Jun. 9, 2009

(54) COMMUNICATIONS BUS FOR A PARALLEL PROCESSING SYSTEM

(75) Inventors: Richard S. Norman, Sutton (CA); Yves Blaquière, Chambly (CA); Yvon Savaria, Montréal (CA)

(73) Assignee: Hyperchip Inc., Montreal, Quebec (CA)

( * ) Notice: Subject to any disclaimer, the term of this patent is extended or adjusted under 35 U.S.C. 154(b) by 1855 days.

(21) Appl. No.: 10/324,071

(22) Filed: Dec. 20, 2002

(65) Prior Publication Data

US 2003/0140188 A1 Jul. 24, 2003

(51) Int. Cl.
*H03K 17/693* (2006.01)

(52) U.S. Cl. .......................................... 716/15; 716/17
(58) Field of Classification Search ........................ None
See application file for complete search history.

(56) References Cited

U.S. PATENT DOCUMENTS

| | | | | |
|---|---|---|---|---|
| 4,621,201 A | * | 11/1986 | Amdahl et al. | ................. 326/11 |
| 5,266,833 A | * | 11/1993 | Capps | ......................... 257/690 |
| 5,625,563 A | * | 4/1997 | Rostoker et al. | ................ 716/2 |
| 6,858,356 B2 | * | 2/2005 | Savaria et al. | ................... 430/5 |
| 6,928,606 B2 | * | 8/2005 | Savaria et al. | ................ 714/797 |

\* cited by examiner

*Primary Examiner*—Chi H. Pham
*Assistant Examiner*—Soon D. Hyun
(74) *Attorney, Agent, or Firm*—Ogilvy Renault LLP (57) ABSTRACT

A communications bus enables communication of data signals in a parallel processing system having a plurality of substantially identical cells, each cell having an access point for transmitting data signals into the communications bus. The communications bus includes a plurality of parallel channels, and at least one channel crossover point associated with each cell. Each crossover point implements a regular change in a channel order of the communications bus, such that each access point is coupled to a channel of the communications bus. Propagation delays are reduced by inserting buffers at regular intervals along the length of each channel. An output buffer at a downstream boundary of each power domain of the system prevents undesired currents due to voltage mismatch. The propagation direction of data signals away from the access point, and propagation of data to an adjacent downstream cell can be controlled to reduce bus traffic and power consumption.

40 Claims, 11 Drawing Sheets

COMMUNICATIONS BUS FOR A PARALLEL PROCESSING SYSTEM

CROSS-REFERENCE TO RELATED APPLICATIONS

This is the first application filed for the present invention.

MICROFICHE APPENDIX

Not Applicable.

TECHNICAL FIELD

The present invention relates to parallel processing systems, and in particular to a communications bus for a parallel processing system.

BACKGROUND OF THE INVENTION

Complex electronic systems are typically designed using multiple integrated circuit (IC) packages mounted on a printed circuit board with interconnects between the packages provided by traces on the printed circuit board. This approach to system design is highly versatile, because a designer can develop a wide range of different systems by selecting from a comparatively limited number of standard IC packages having well defined functionality. Isolation and correction of defects is also simplified, because each IC package can be tested individually, and any packages found to be defective can be replaced. In the case of parallel processing systems, this modular design approach is frequently extended by placing each processor element (and its associated interface, memory, and power management devices) on a single printed circuit (PC) board. Several such PC boards are then connected to a communications "backplane" to construct the parallel processing system.

Well known disadvantages of the use of such a modular design approach include the comparatively large physical distances separating each IC of the system (which adversely affects system speed), and increased system noise due, among other things, to Radio Frequency Interference (RFI) and impedance mismatches between "on-chip" circuit traces and the PC board lines between the IC packages. All of these factors negatively impact system performance. Designers have recognized that wafer-scale integration (WSI); that is, the manufacture of entire systems (or major system components) on a single wafer provides an effective means of maximizing system performance by simultaneously addressing both of these limitations.

However, a primary limiting factor in integrated circuit fabrication is that, as the size of an IC increases, so does the probability that manufacturing defects (e.g., a dust particle on the surface of the wafer or physical defects in the wafer) will damage at least part of the circuitry on the wafer. This problem is typically expressed in terms of "yield"; that is, the number of serviceable IC's that can be manufactured from each wafer. With current manufacturing methods using 30 cm diameter wafers (approx. 700 cm2 surface area), the yield for IC's covering about 5 mm2 is close to 100%. By contrast, for IC's of about 5 cm2, the yield can be up to about 80% depending on process maturity. As the size of an IC increases toward the total wafer area, the expected yield drops to close to zero, thereby effectively prohibiting the development of practical systems covering the entire surface of the wafer.

For the purposes of the present disclosure, a "defect" shall be understood to refer to a physical disturbance or an anomaly that affects a manufactured component. Common sources of defects include dust particles on a wafer surface during manufacture. A "fault" shall be understood to refer to a change or anomaly in the logical behavior of one or more components. In many cases, defects will produce faults, and thus can be inferred from detected anomalous behavior of an IC. However, this is not always the case; some faults are not related to defects, and some defects do not produce faults. An example of the later case in a fault that pinches, but does not sever a wire.

Various techniques are known for producing fault-tolerant IC's. For example, U.S. Pat. No. 4,621,201 to Amdahl et al. teaches a fault-tolerant IC system in which plural copies of each circuit are manufactured on a single wafer. Predetermined circuit element groups of the copies are interconnected, following manufacture, to assemble the working system. According to Amdahl et al., a majority voting scheme is used, which requires at least triple redundancy for each circuit to be protected. Alternatively, fused links can be used to statically remove defective elements from the circuit. This implies having at least a one-for-one redundancy for each circuit to be protected.

Both of these techniques imply a highly inefficient utilization of the surface of the wafer. In particular, the technique of Amdahl et al. results in a utilization efficiency of about 33%, while the use of fused links achieves, at best, a 50% efficiency. Successful implementation of WSI systems requires a fault-tolerant system architecture that remains serviceable in the presence of manufacturing defects, while maximizing utilization efficiency of the wafer surface.

Another difficulty with WSI is the size of the reticle used for generating circuit traces and components on the surface of the wafer. In practice, the largest usable reticle covers an area of about 2 cm×2 cm, so that multiple reticle images must be used to cover the entire wafer. However, the cost of preparing multiple unique reticles for a single wafer is prohibitive. In the case of a parallel processing system, each processor element of the system can be identical, and a reticle image may cover one or more processor elements. Thus, in principle, a single reticle could be used to generate every processor element. However, the connectivity of each processor element to associated communications busses must necessarily be unique. Development of a cost-effective WSI parallel processing system requires a system architecture in which a single reticle can generate multiple cells of the parallel processing system, each cell having a unique connectivity to a communications bus.

As noted above, defects during manufacture cannot be entirely eliminated. It is therefore essential to be able to determine the operability of each cell (and bus) of a system following manufacture. Traditional techniques, such as functional or "edge connector" tests, and in-circuit or "bed-of-nails" testing are impractical for WSI parallel processing systems. Currently, boundary scan testing is the one of the best practical ways of detecting faults in highly complex digital integrated circuits. Boundary scan testing uses built-in test logic to verify the operation of internal elements (including the absence of manufacturing defects) of complex systems and integrated circuits. The Joint Test Access Group (JTAG) has developed a boundary scan test implementation that is the only systematic technique that has been standardized for this task, and is sanctioned by the Institute of Electrical and Electronic Engineers (IEEE) under standard 119.1.

According to the IEEE 119.1 standard, a standard Test Access Port (TAP) is located "on chip" for testing each IC of the system. Each TAP has a closely similar structure, including Instruction, Bypass, and test data registers, as well as instruction decode logic, output multiplexers and TAP controller logic for controlling operation of the TAP. In a WSI parallel processing system, each cell may include one or more TAPs for testing the cell's processor element and associated circuitry. Every TAP of the system is connected, in series, on a four- or five-wire "scan chain bus" to form one or more continuous "scan chains" spanning the entire system. Each scan chain has an external appearance (that is, from the point of view of external system test logic) of a linear shift register, in which every TAP can be represented by a unique set of addresses. This enables each TAP to be individually accessed to test specific IC's of the system, and test results obtained for analysis. As a result, IEEE 119.1 provides an efficient system for testing very complex systems, such as WSI parallel processing systems. The individual accessibility provided by IEEE 119.1 is often used for other tasks such as boot-strapping, debugging and configuring.

However, implementation of a boundary scan system requires that several TAPs be connected, in series, on a common scan chain. In a system architecture that uses a single reticle to image every cell of a parallel processing system, it is desirable to incorporate traces for this scan chain into the common reticle. This means that scan chain bus traces will be identically duplicated in every reticle image. Within a matrix of identical cells on a wafer, this situation is satisfactory, yielding desired scan chain bus lines and connections spanning multiple reticles. However at the edges of the matrix, a different set of connections will normally be desired. In particular, the signal paths will normally need to "wrap" from one row of cells to a next row of cells (rather than continue to a next successive cell along the same row, for example). It would be desirable to use a single reticle to generate both small scale circuit structures (e.g., of each cell) and large scale circuit structures (such as the scan chain) spanning several reticles on a wafer.

Implementation of a scan chain in a WSI system involves generating circuit structures of the scan chain (e.g. TAPs and scan chain busses) on the wafer. As will be appreciated, if a manufacturing defect severs the scan chain, then the entire wafer becomes both untestable and unconfigurable, and must therefore be discarded. A known method of reducing the effect of this vulnerability is to implement parallel redundant scan chains that follow physically diverse paths through the wafer. For each IC under test, a pair of TAPs perform a boundary scan, and the results are combined using a voting scheme. The use of physically diverse paths reduces the probability that a single defect will sever both chains. Furthermore, the voting scheme implemented for each pair of TAPs reduces the probability that defects at different locations on the wafer (and affecting both chains) will render the scan chain as a whole inoperative. However, if a manufacturing defect has the effect of disabling both of the TAPs testing an IC, then both of the redundant scan chains will be severed, and the scan chain as a whole will fail. In a multi-cell parallel processing system, this situation may arise, for example, when the manufacturing defect affects a large area (covering most or all of a cell), or affects control (e.g. for power supply or clock signal) lines to a cell.

Accordingly, a system architecture for a wafer-scale parallel processing system that remains serviceable in the presence of manufacturing defects, remains highly desirable.

SUMMARY OF THE INVENTION

An object of the present invention is to provide a communications bus architecture that enables a single reticle to image multiple cells of a parallel processing system, each cell having a unique connectivity to the communications bus.

Thus an aspect of the present invention provides a communications bus of a parallel processing system having a plurality of substantially identical cells, each cell having an access point for transmitting data signals into the communications bus. The communications bus includes a plurality of parallel channels, and at least one respective channel crossover point associated with each cell. Each crossover point implements a regular change in a channel order of the communications bus, such that each access point is coupled to a unique one of the channels of the communications bus.

Preferably, the regular change in the channel order of the communications bus follows a predetermined channel-weaving pattern that is identical for each crossover point. The channel weaving pattern may define a unique channel order of the communications bus at each access point.

In some embodiments, each channel carries data signals in a predetermined direction. Physically adjacent channels within the bus may carry data signals in respective opposite directions.

In some embodiments, each access point is coupled to first and second channel branches, which are designed to carry data signals in respective opposite directions away from the access point. The access point may be designed to control a direction of propagation of the data signals away from the access point. For this purpose, the access point may include a junction between each channel branch and a respective access bus. With this arrangement, the direction of propagation of the data signals away from the access point is controlled by outputting the data signals through either one or both of the access busses. Alternatively, the access point may include a respective AND-gate disposed in each channel branch. With this arrangement, the direction of propagation of the data signals away from the access point can be controlled by supplying a predetermined control signal to either one or both of the AND-gates.

The first and second channel branches may be defined by respective portions of a common talker-owned channel of the communications bus. Alternatively, each of the first and second channel branches may be defined by a respective portion of first and second talker-owned channels of the communications bus. In this case, each one of the first and second talker-owned channels may include and active and inactive portions. The active portion defines the respective channel branch and carries data signals sourced from the associated cell. The inactive portion may be terminated near (or in) the access point, or can be coupled to the cell in order to carry inbound signals destined for the cell.

In some embodiments, each channel includes a buffer associated with each cell. Preferably, a pair of inverting buffers are associated with each cell, with each inverting buffer being arranged to drive a respective portion of the channel within the cell. Each of these portions preferably have similar lengths.

An output buffer may also be provided within each channel, near a downstream cell boundary.

Each channel may also include a monitor point associated with each cell. The monitor point is coupled to an input bus of the cell, such that data traffic in the channel can be monitored by the cell. If desired, an AND-gate can be provided in each channel downstream of the monitor point. By this means, propagation of data signals to an adjacent (downstream) cell can be controlled by supplying a predetermined control signal to the AND-gate.

BRIEF DESCRIPTION OF THE DRAWINGS

Further features and advantages of the present invention will become apparent from the following detailed description, taken in combination with the appended drawings, in which:

FIGS. 6a and 6b schematically illustrate a reticle incorporating a communications bus in accordance with a third embodiment of the present invention, and a communications bus generated using the reticle of FIG. 6a;

FIGS. 7a and 7b schematically illustrate a reticle incorporating a communications bus in accordance with a fourth embodiment of the present invention, and a communications bus generated using the reticle of FIG. 7a;

FIGS. 8a and 8b schematically illustrate a reticle incorporating a communications bus in accordance with a fifth embodiment of the present invention, and a communications bus generated using the reticle of FIG. 8a;

FIGS. 9a and 9b schematically illustrate a reticle incorporating a communications bus in accordance with a sixth embodiment of the present invention, and a communications bus generated using the reticle of FIG. 9a;

It will be noted that throughout the appended drawings, like features are identified by like reference numerals.

DETAILED DESCRIPTION OF THE PREFERRED EMBODIMENT

Figure 1:
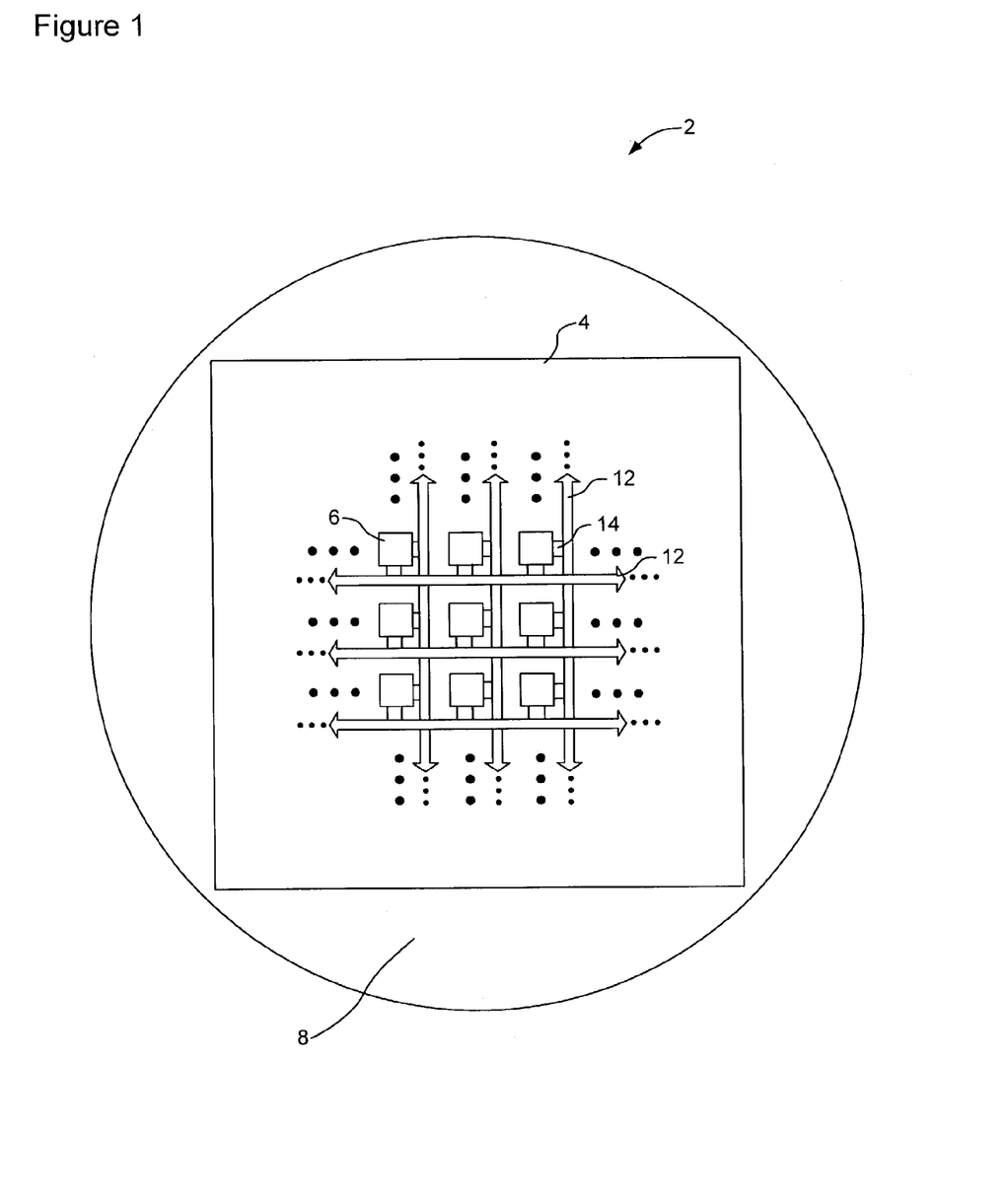
FIG. 1 is a schematic illustration of a parallel processing system arranged on the surface of a substrate, in accordance with an embodiment of the present invention.

The present invention provides a communications bus for a wafer-scale integrated (WSI) parallel processing system. FIG. 1 schematically illustrates principle features of an exemplary wafer-scale parallel processing system in which the present invention may be deployed.

As shown in FIG. 1, the WSI parallel processing system 2 generally comprises a rectangular (other shapes are possible) matrix 4 of cells 6 disposed on a wafer 8 (or, more broadly, a substrate 8). Each cell 6 is substantially identical, and encompasses a respective processor element 10 (FIG. 2) and associated circuit elements (not shown). A mesh of communications busses 12 link the cells 6 and carry data signals between cells 6 within the matrix 4, and between the matrix 4 and external devices (not shown). Each communications bus 12 is associated with a respective set (i.e., a row or a column) of cells 6, and includes a respective access point 14 associated with each cell 6 to facilitate bus access by the respective cell 6.

Each bus 12 includes a plurality of parallel channels 16 (see FIG. 2), each of which may be configured to carry serial or parallel data signals. In either case, each channel 16 is "talker-owned", in that each channel exclusively carries data signals sourced from (and control signals pertaining to) a unique one of its associated cells 6. In addition, each channel 16 may also include one or more control lines for carrying control signals for that cell 6. Each cell 6 can also be coupled to receive data signals from each of the channels 16 of the bus 12 (including its own channel).

As mentioned previously, it is preferable to use a single reticle (encompassing one or more cells, access points, and respective portions of associated communications busses) repeatedly to generate the entire matrix 4. This means that an identical pattern of circuit traces (and components) will be generated within each reticle. Designing circuit traces on a "per-cell" basis allows the cell 6 to be repeated (in principle, infinitely) to construct a massively parallel processing system of any arbitrary size (constrained primarily by the size of the reticle image on the substrate 8 and the dimensions of the substrate itself). The communications bus 12 of the present invention enables this to be accomplished, while ensuring that the access point 14 of each cell 6 is properly coupled to its respective talker-owned channel of the bus.

Figure 2A:
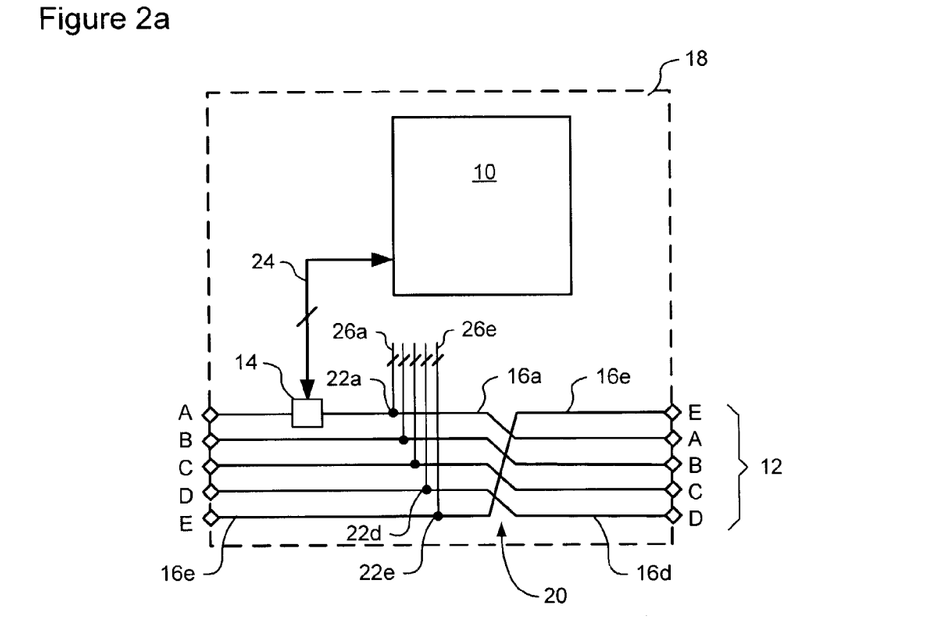
FIGS. 2a and 2b schematically illustrate a reticle 18 comprising a respective portion of a communications bus in accordance with a first embodiment of the present invention.
Figure 2B:
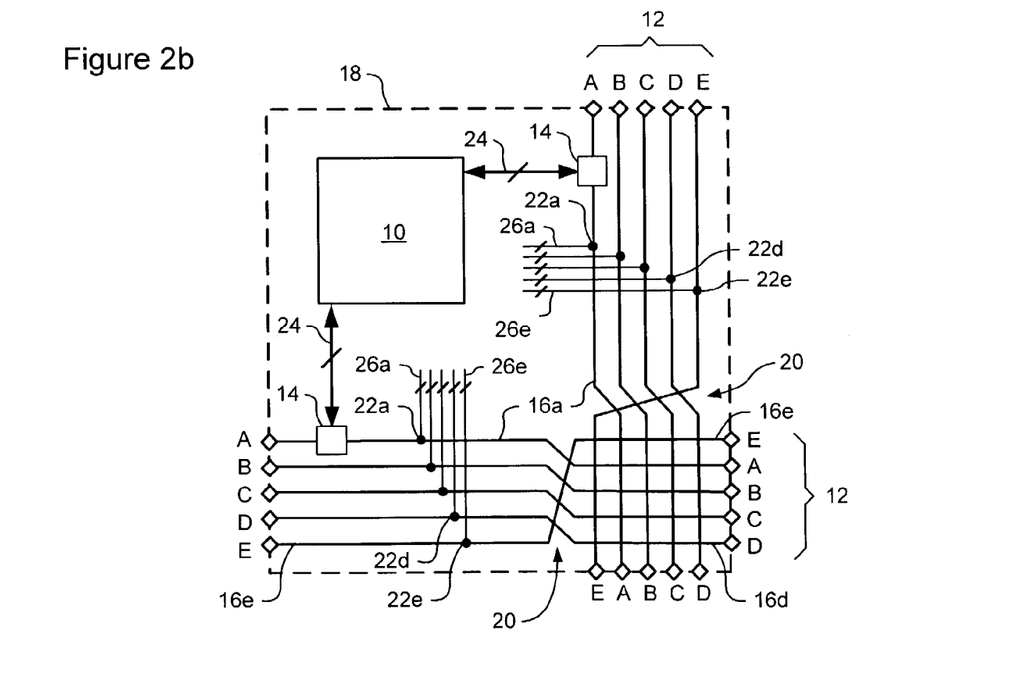

FIGS. 2a and 2b schematically illustrate a reticle 18 encompassing a respective portion of a communications bus 12 in accordance with a first embodiment of the present invention. For the purposes of illustration, the reticle 18 encompasses a single cell 6 of the matrix 4, and as such covers the smallest unit that can be repeated without modification to generate the entire cell matrix 4. It will be appreciated, however, that the reticle 18 could equally be designed to encompass any suitable number of cells 6.

As shown in FIG. 2a, the communications bus 12 includes an access point 14, a crossover point 20 and a set of monitoring points 22 associated with each cell 6. In the illustrated embodiments, each channel 16 is represented by a single line, so as to simplify illustration and description. It will be appreciated, however, that each channel 16 will normally be composed of multiple circuit traces. For example, each channel 16 may be composed of 32 circuit traces for data signals, and a number (e.g., eight) of control lines, in which case each channel 16 would be composed of a bundle of 40 parallel circuit traces. As mentioned previously, each channel 16 is "talker-owned", in that one channel (in this case channel A, 16a) exclusively carries data signals from a respective cell 6. In addition, the control lines within the talker-owned channel 16a exclusively carry control signals, e.g., clock, power, reset, configuration control, etc.) that specifically pertain to the associated cell 6. Accordingly, the access point 14 provides a plurality of taps (not shown) for connecting each circuit trace of the talker-owned channel 16a to a respective circuit trace of an access bus 24 of the cell 6.

The monitoring points 22 are designed to enable the cell 6 to receive data signals propagating in each channel 16 of the communications bus 12. Thus each monitoring point 22 provides a plurality of taps (not shown) for connecting each data-carrying circuit trace of a respective channel to a respective circuit trace of an input bus 26 of the cell 6.

Figure 3:
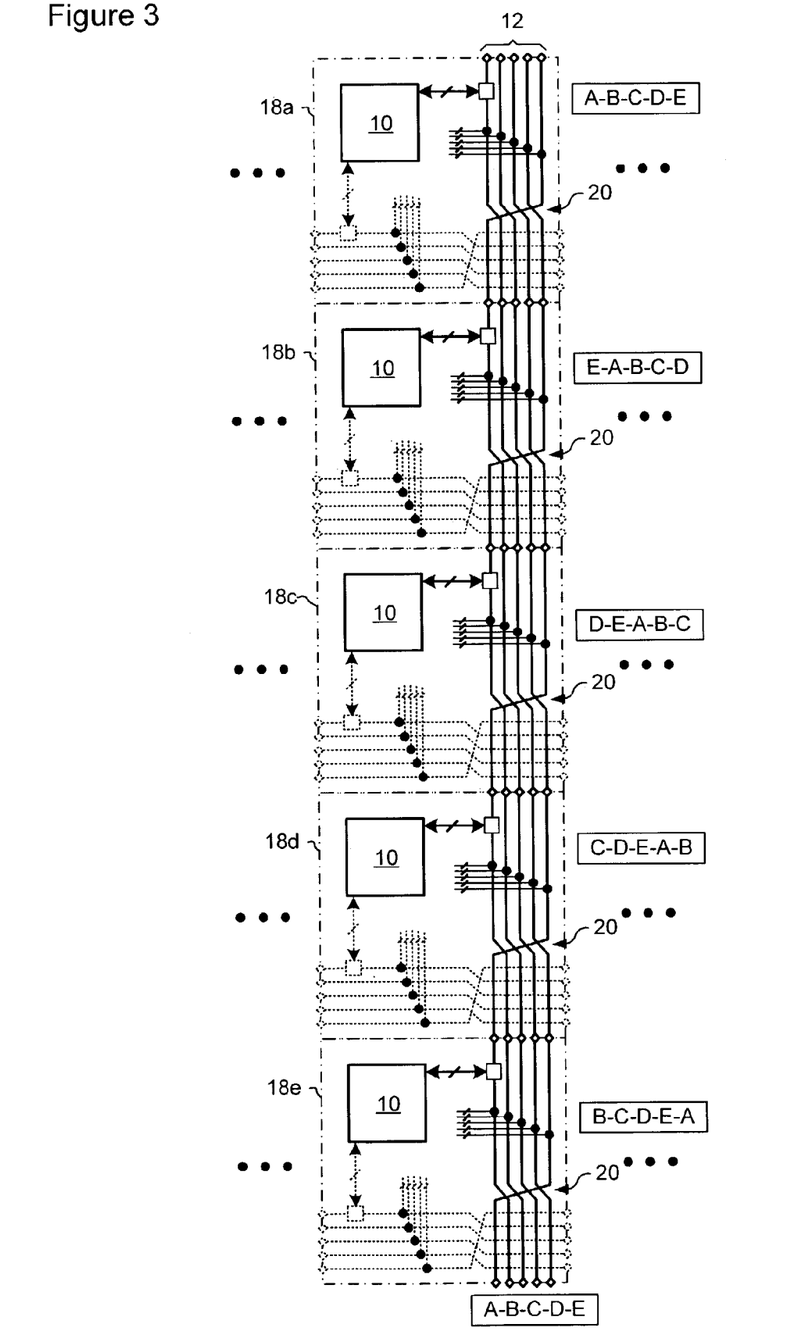
FIG. 3 schematically illustrates five adjacent reticles in accordance with the embodiment of FIG. 2b, arranged to produce a single column of a cell matrix.

In order to ensure that each cell 6 of the matrix 4 is coupled to a unique talker-owned channel 16 of the communications bus 12, the channel order of the bus 12 is changed in accordance with a regular "incremental" channel-weaving pattern implemented within the channel crossover point 20. In the embodiment of FIGS. 2 and 3, the channel-weaving pattern involves swapping one channel 16 from one peripheral edge of the bus 12 to the opposite peripheral edge of the bus. Thus, in the embodiment of FIG. 2a, channel A, 16a crosses all of the other channels (channels B-E) to the opposite peripheral edge of the bus 12. Each of the crossed channels (i.e., channels B-E) are also shifted laterally (as shown in FIGS. 2 and 3) in order to ensure that the circuit traces of each channel 16 will be properly aligned with (and thus will make a connection with) corresponding traces of an adjacent reticle 18. As may be appreciated, this arrangement enables multiple images of the reticle 18 to be arranged adjacent one another to form a continuous communications bus 12 spanning a complete row of cells 6 of the matrix 4.

The embodiment of FIG. 2b is similar to that of FIG. 2a, except that the reticle 18 includes circuit traces defining two orthogonal communications buses 12 associated with the cell 6. Each communications bus has a respective access, crossover and monitoring points 14, 20 and 22, each of which are constructed as described above with reference to FIG. 2a.

FIG. 3 is a block diagram showing five adjacent reticles 18 in accordance with the embodiment of FIG. 2b, arranged to produce a single column of the cell matrix 4. As can be seen in FIG. 3, the circuit traces forming each channel 16 of the communications bus 12 within each reticle 18 match corresponding circuit traces in adjoining reticles 18, so that a continuous communications bus 12 spanning the entire column is formed. As will be appreciated, the column of FIG. 3 can be duplicated as required to generate a rectangular matrix 4 of cells 6 interconnected by a mesh of orthogonal communications busses 12, as illustrated in FIG. 1.

As described above, the channel-weaving pattern ensures that the access point 14 of each cell 6 is coupled to a unique one channel of the communications bus 12. This feature is illustrated in FIG. 3. In particular, at the top of the column in FIG. 3, (which may, for example, be coupled to various control, interface, or other circuits external to the cell matrix) the channel order of the bus 12 is A-B-C-D-E. The access point 14 of the first cell 6 is coupled to channel A of the communications bus 12. The crossover point 20 of the first (i.e., uppermost) cell 6 alters the channel order to E-A-B-C-D so that the access point 14 of the second cell 6 is coupled to channel E of the communications bus 12. The crossover point 20 of the second cell 6 changes the channel order to D-E-A-B-C, so that the access point 14 of the third cell 6 is coupled to channel D. This channel-weaving pattern is repeated for every cell 6, so that the access points 14 of the fourth and fifth cells are coupled to channels C and B, respectively. Thus it will be seen that the access point 14 of each cell 6 is coupled to a unique one of the channels 16 of the communications bus, in spite of the fact that the circuit traces within each reticle 18 are identical.

In the illustrated embodiments, the communications bus 12 comprises five parallel channels 16. As a result, the channel order will repeat itself if more than five cells are arranged along a single column (or row) of the matrix 4. In practice, the cell matrix 4 can be designed to include any desired number of cells 6 within each column (or row), by providing an appropriate number of channels 16 within each involved communications bus 12. The weaving pattern illustrated in the embodiments of FIGS. 2 and 3 can seamlessly accommodate any arbitrary number of channels 16, and so does not in itself impose any restrictions on the maximum number of cells 6 within any row or column of the cell matrix 4.

Figure 4A:
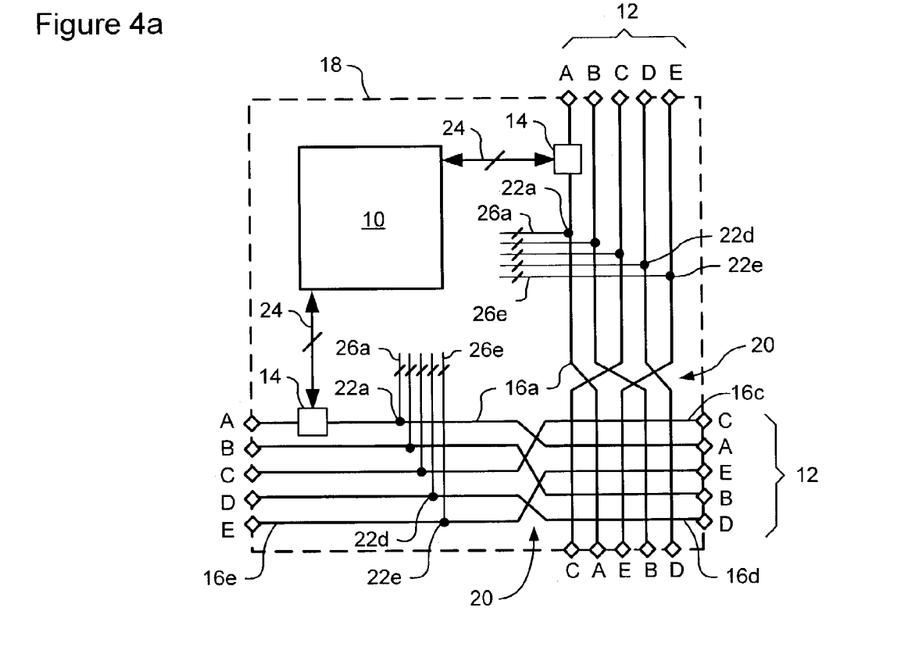
FIGS. 4a and 4b schematically illustrate a reticle incorporating a communications bus in accordance with a second embodiment of the present invention.
Figure 4B:
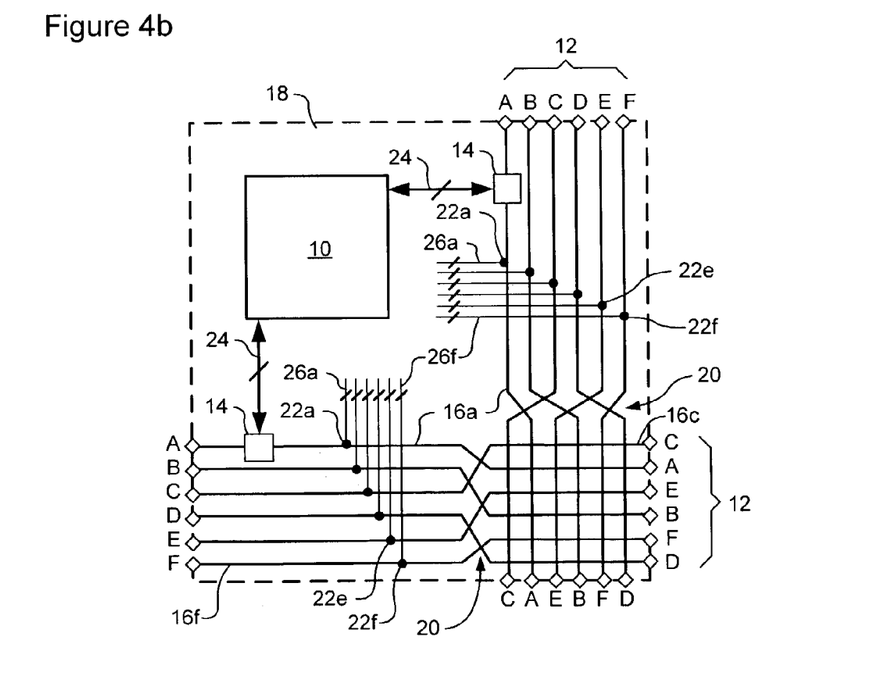

FIG. 4 schematically illustrates a reticle 18 incorporating a communications bus 12 in accordance with a second embodiment of the present invention. In general, the embodiment of FIG. 4 is similar to the embodiment of FIG. 2b in that circuit traces forming respective portions of a pair of orthogonal communications busses 12 are encompassed within the reticle 18. The difference between the embodiments of FIGS. 4 and 2b lies in the channel-weaving pattern implemented within the crossover point 20 of each communications bus 12. In particular, in the channel-weaving pattern of FIG. 4, each channel 16 crosses at least one other channel 16. As can also be seen in FIG. 4a, some of the channels are laterally offset in one direction, while the remaining channels are offset in the opposite direction. Because the communications bus 12 of FIG. 4a is composed of an odd number of channels 16, the channel-weaving pattern implemented within the crossover point 20 is asymmetrical. In cases where the communications bus 12 includes an even number of channels 16, this channel-weaving pattern is fully symmetrical about the longitudinal center axis of the communications bus 12, as may be seen in FIG. 4b.

Figure 5A:
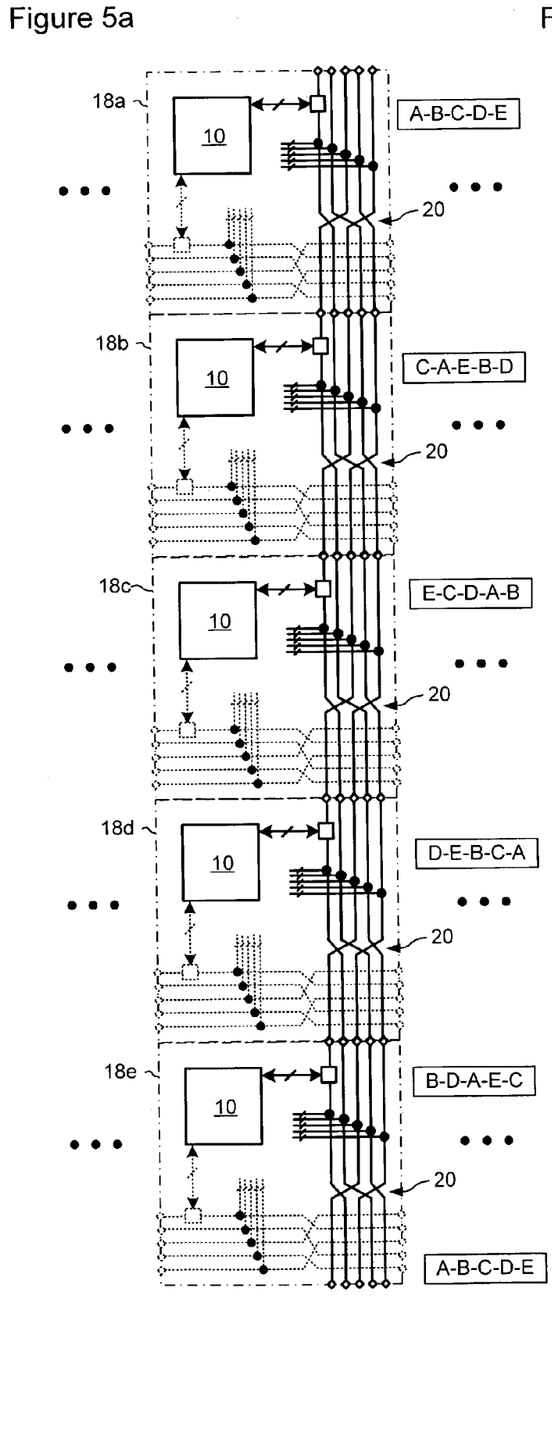
FIGS. 5a and 5b schematically illustrates five adjacent reticles in accordance with the embodiment of FIG. 4a, arranged to produce a single column of a cell matrix.
Figure 5B:
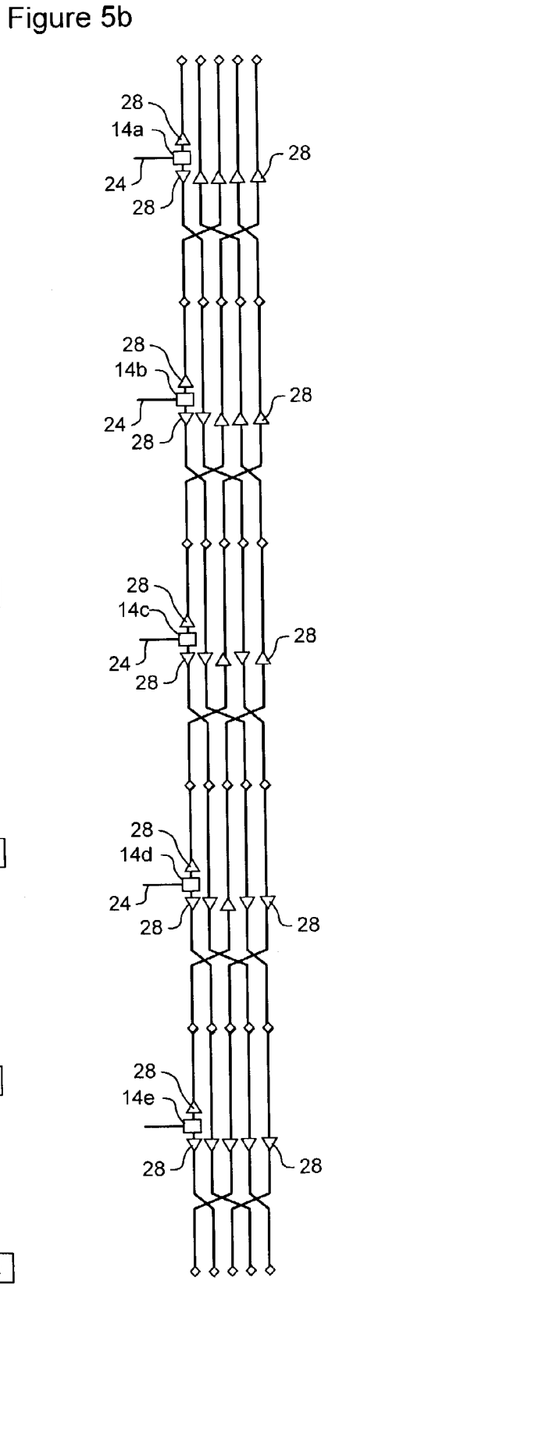

FIG. 5a schematically illustrates a column of the cell matrix 4 constructed using five reticles 18 in accordance with the embodiment of FIG. 4a. As may be seen in FIG. 5a, the arrangement of identical reticles 18 adjacent one another results in circuit traces of the communications bus 12 in each reticle 18 matching corresponding circuit traces in each adjacent reticle 18 to produce a continuous communications bus 12 spanning the entire column. As in the embodiment of FIG. 3, the channel-weaving pattern implemented within each crossover point 20 results in a unique channel order of the communications bus 12 at each access point 14. As a result, while the pattern of circuit traces within each reticle 18 is identical, each access point 14 is coupled to a unique one of the channels 16 of the communications bus 12.

In the embodiments of FIGS. 2-5, the channel-weaving pattern implemented within each crossover point 20 results in a unique channel order of the communications bus 12 at each access point 14. This ensures that each access point 14 is coupled to a unique one of the channels 16 of the communications bus 12. However, as is known in the art, data signals transmitted through the communications bus 12 are subject to a propagation delay that varies with the square of the propagation length. For a WSI system manufactured on a 30 cm substrate 8, each communications bus 12 can easily exceed 20 cm in length, leading to unacceptable propagation delays. This problem can be addressed by inserting buffers into the communications bus 12 at regular intervals. However, a buffer is a unidirectional device. As shown in FIG. 5b, when buffers 28 are inserted into the communications bus 12 of FIG. 5a, and oriented appropriately for the direction of signal propagation in each channel 16, the "per-cell" repetition of circuit traces is broken. Consequently, a single reticle 18 in accordance with the embodiments of FIGS. 2-5 cannot be repeated to construct a wafer-scale communications bus 12 incorporating buffers 28 to reduce propagation delays.

Figure 6A:
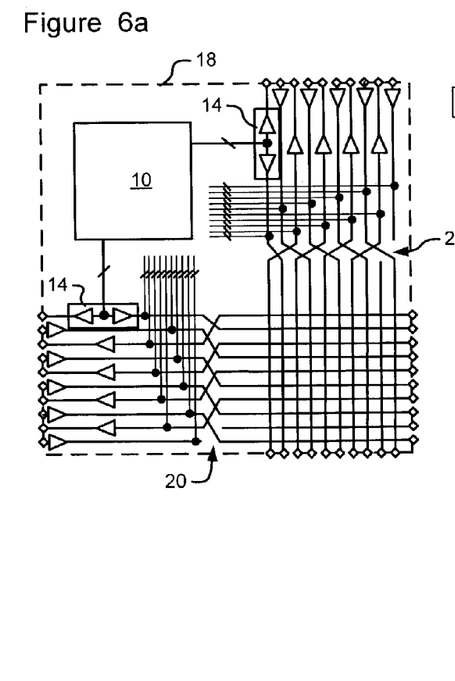

FIG. 6a schematically illustrates a reticle 18 incorporating a communications bus 12 in accordance with a third embodiment of the present invention. In the embodiment of FIG. 6a, a "per cell" repeating pattern is obtained by doubling the number of channels 16 in the communications bus 12. In effect, the communications bus 12 of FIG. 6 requires ten channels 16 to support five cells 6. As may be seen in FIG. 6b, of the ten channels 16, only five (indicated by solid lines) are coupled to an access point 14 of a cell 6, and thus are used to actively convey traffic of respective channels. The remaining channels 16 (indicated by dashed lines) are inactive. As may be seen in FIG. 6a the access point 14 includes a pair of buffers 28 oriented in opposite directions, so that data signals sourced from the associated cell 6 can propagate in both directions of its associated channel 16. Each of the remaining channels 16 includes a single buffer 28, which is oriented so that data signals in adjacent channels 16 propagate in opposite directions. This latter feature is advantageous in that it helps to reduce interference due to cross-talk between adjacent channels 16. However, in the embodiment of FIG. 6, this alternating pattern of propagation directions is obtained at a cost of one channel being "broken" at the crossover point 20, in that one channel is severed into two bundles 30t of circuit traces, which are terminated within the reticle 18, rather than joining to form a continuous channel spanning the reticle 18.

Figure 6B:
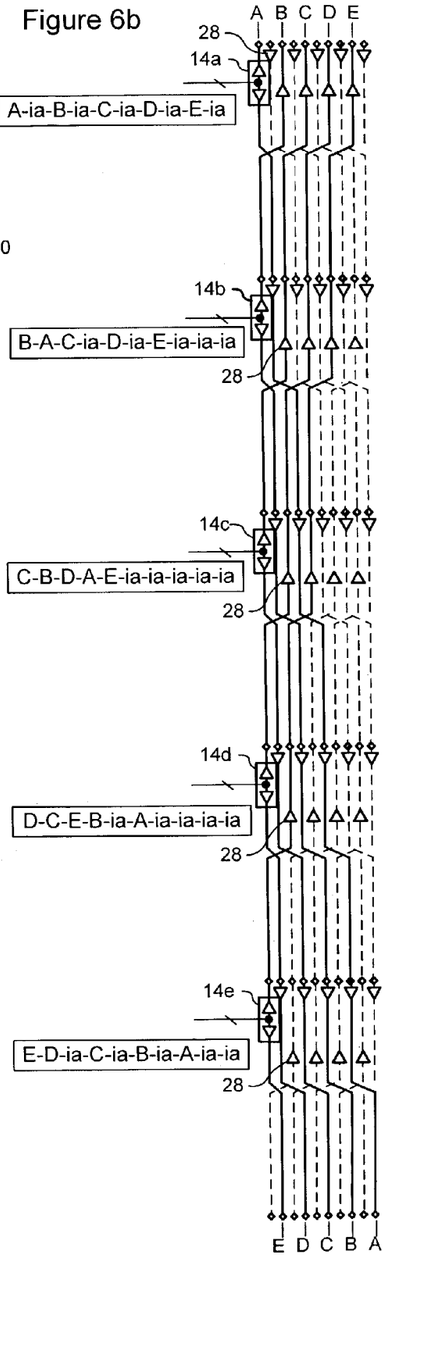

FIG. 6b schematically illustrates a column of the cell matrix 4 constructed using five reticles 18 in accordance with the embodiment of FIG. 6a. As may be seen in FIG. 6b, the arrangement of identical reticles 18 adjacent one another results in circuit traces of the communications bus 12 in each reticle 18 matching corresponding circuit traces in each adjacent reticle 18 to produce a continuous communications bus 12 spanning the entire column. As in the embodiment of FIGS. 2-5, the channel-weaving pattern implemented within each crossover point 20 results in a unique channel order of the communications bus 12 at each access point 14, so that each access point 14 is coupled to a unique one of the channels 16 of the communications bus 20. In FIG. 6b, active channels 16 (i.e. channels A-E) are shown as solid lines, while inactive channels 16 (identified as "ia") are shown in dashed lines. Each active channels 16 is a "talker-owned" channel 16 uniquely associated with one of the five cells 6, and carries data signals sourced from that cell to both opposite ends of the communications bus 12. While circuit traces of each inactive channel 16 are required in order to maintain continuity and repeatability, they do not carry data, and thus may be coupled to a reference voltage, rather than being left to float.

As may be seen in FIG. 6b, the channel weaving pattern implemented in each cross-over point 20 ensures that, in those areas where active channels 16 lie adjacent one another, data signals of each involved channel 16 propagate in opposite directions. Elsewhere, active channels 16 are separated by at least one inactive channel 16.

As described above, the embodiment of FIGS. 6a,b provides "per cell" repetition of the reticle 18, and opposite signal propagation direction in adjacent channels 16 of the communications bus 12. However, as may be seen in FIG. 6b, the active channels 16 tend to be clustered at one side of the communications bus 12, particularly in the center region of the bus 12. This is disadvantageous from the point of view of heat dissipation. In this respect, an even distribution of active channels 16 across the communications bus 12 would be preferred.

Figure 7A:
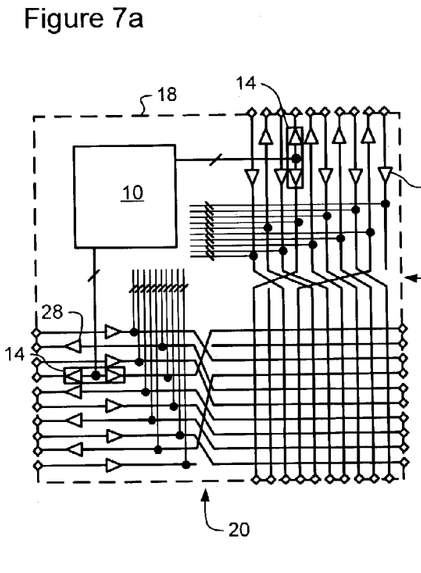
Figure 7B:
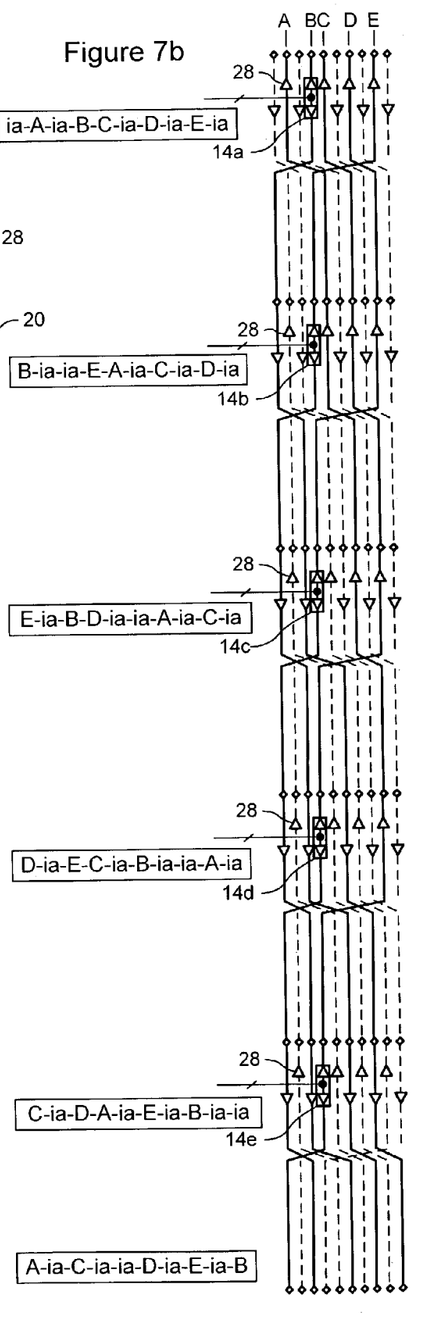

FIG. 7a schematically illustrates a reticle 18 incorporating a communications bus 12 in accordance with a fourth embodiment of the present invention. As in the embodiment of FIG. 6a, the "per cell" repeating pattern is obtained by doubling the number of channels 16 in the communications bus 12. In this case, however, the channel weaving pattern implemented in each cross-over point 20 is arranged to more evenly spread the active channels 16 across the width of the communications bus 12, as may be seen in FIG. 7b.

Figure 8A:
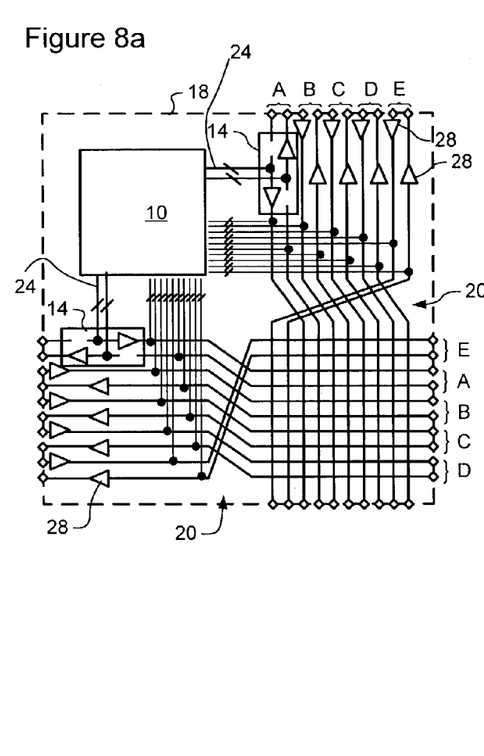

FIG. 8a schematically illustrates a reticle 18 incorporating a communications bus 12 in accordance with a fifth embodiment of the present invention. As may be seen in FIG. 8a, the channel weaving pattern implemented in each cross-over point 20 is similar to that of the embodiment of FIGS. 2-3. In this case, however, a "per cell" repeating pattern (with buffers 28) is obtained by providing a pair of (parallel) channels 16 for each cell 6. Within each of the paired channels 16, the buffers 28 are oriented such that each channel carries data signals in a direction opposite that of the other channel 16. An advantage of this "paired channel" arrangement is that the portion of each channel extending from the access point 14 in the rearward direction relative to the propagation direction is "inactive". As such, this portion of each channel does not carry data signals sourced from the cell, and may therefore be decoupled from the access point 14 (as shown in FIG. 8a). However, it will be appreciated that this rearward portion of the channel 16 can provide an input path through which various data (e.g., an input data stream, control data etc.) can be supplied to the cell 6 without interfering with data signals sourced from the cell and carried by the "active" portions of the paired channels 16.

In the embodiment of FIG. 8a, a respective access bus 24 is shown connected to each of the paired channels 16 at the access point 14. This arrangement enables the cell 6 to forward data in a selected one (or both) directions, as required (at a cost of doubling the number of circuit traces coupling the access point 14 to the cell 6). A benefit of this arrangement is that substantial power savings (up to about 50%) can be obtained by forwarding data only in the direction of its intended destination, as compared to "blindly" sending data in both directions without reference to its intended destination. Various methods are known in the art by which a cell 6 may readily determine an appropriate direction for forwarding data on a bus 12 in order to minimize propagation delays, unnecessary bus traffic, and power consumption.

Figure 8B:
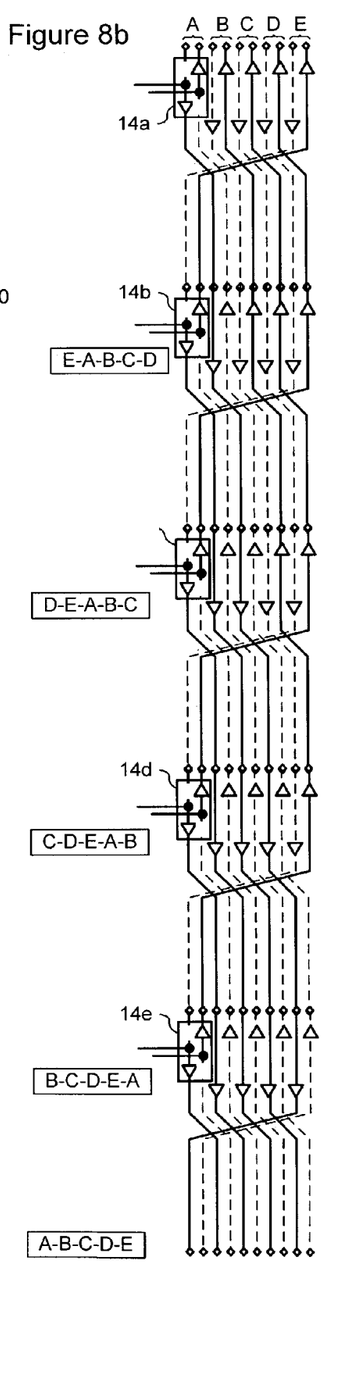

As may be seen in FIG. 8b, active and inactive channels 16 are relatively evenly distributed across the width of the communications bus 12. In most cases, active channels 16 are separated by at least one inactive channel. In those cases where active channels 16 lie adjacent one another, data signals propagate in opposite directions in each of the involved channels 16.

Figure 9A:
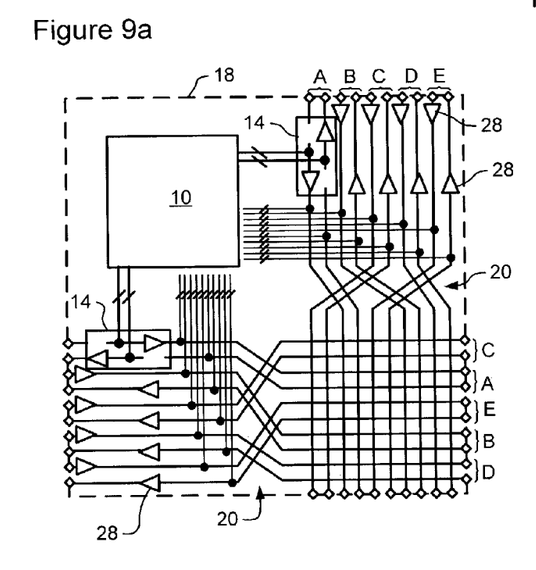
Figure 9B:
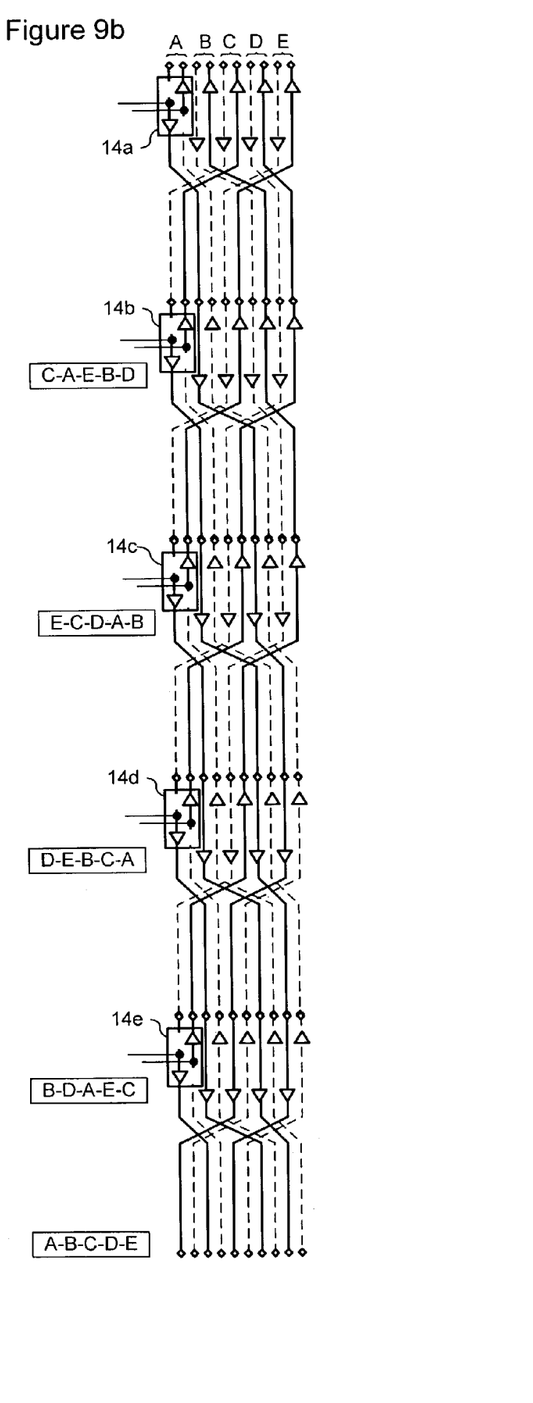

FIG. 9a schematically illustrates a reticle 18 incorporating a communications bus 12 in accordance with a sixth embodiment of the present invention. As may be seen in FIG. 9a, the channel weaving pattern implemented in each cross-over point 20 is similar to that of the embodiment of FIGS. 4-5. As in the embodiment of FIGS. 8a,b, however, a "per cell" repeating pattern (with buffers 28) is obtained by providing a pair of (parallel) channels 16 for each cell 6. Within each of the paired channels 16, the buffers 28 are oriented such that data signals will propagate in opposite directions in each channel 16. As may be seen in FIG. 9b, active and inactive channels 16 are relatively evenly distributed across the width of the communications bus 12. In most cases, active channels 16 are separated by at least one inactive channels 16. In those cases where active channels lie adjacent one another, data signals propagate in opposite directions in each of the involved channels 16.

Figure 10A:
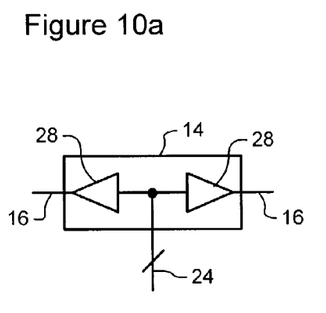
FIGS. 10a and 10b schematically illustrate alternative access points usable in the embodiments of FIGS. 6 and 7.
Figure 10B:
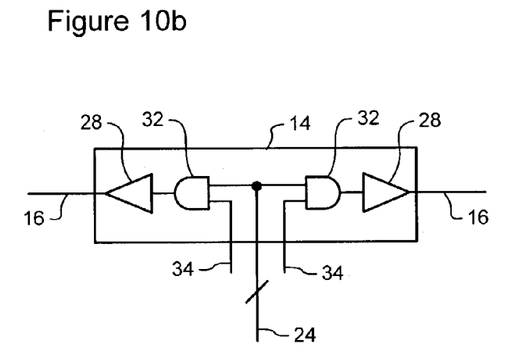

FIGS. 10a and 10b schematically illustrate alternative access points 14 usable in the embodiments of FIGS. 6 and 7. FIG. 10a shows an enlarged view of the access point 14 illustrated in FIGS. 6 and 7. As shown in FIG. 10a, the access point 14 comprises a simple junction between each trace of an access bus 24 and corresponding traces of the associated channel 16. A pair of opposed buffers 28 reduce propagation delays in each direction away from the access point 14. As may be appreciated, the access point 14 of FIG. 10a will simultaneously transmit data signals into the communications bus 12 in both directions. However, as described above, significant power savings (up to 50%) can be obtained by selectively transmitting data signals in only the direction towards an intended destination.

As shown in FIG. 10b, directional control can be obtained by inserting a logical-AND gate 32 to each branch of the access point 14. One input of each AND-gate 32 is coupled to the access bus 24, and so receives data signals from the cell 6. The other input of each AND-gate 32 is coupled to a control line 34, so as to receive a control signal. With this arrangement, a cell 6 can readily control the propagation direction of data signals in the associated channel 16, by applying appropriate control signals to each AND-gate 32. For example, the cell 6 can permit data traffic flow in a selected direction, by applying a digital "1" to the control line 34 of the applicable AND-gate 32. Conversely, applying a digital "0" to the control line 34 of the AND-gate 32 effectively prevents data traffic flow in the respective direction.

In principle, the AND-gate 32 can be located at either the input or the output of its associated buffer 28. However, placing the AND-gate 32 on the buffer input (as shown in FIGS. 10a and 10b) has the advantage that a smaller gate 32 (with proportionately lower power consumption) is possible with this arrangement.

Figure 11A:
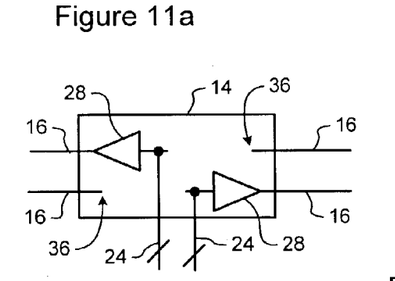
FIGS. 11a and 11b schematically illustrate alternative access points usable in the embodiments of FIGS. 8 and 9.
Figure 11B:
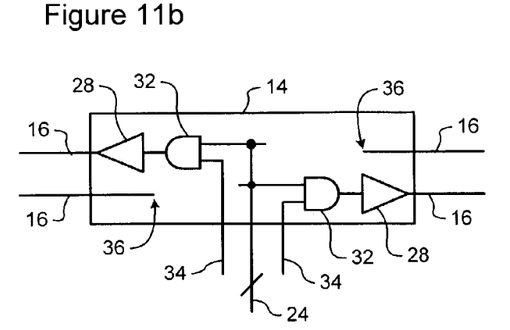

FIGS. 11a and 11b schematically illustrate alternative access points 14 usable in the embodiments of FIGS. 8 and 9. FIG. 11a shows an enlarged view of the access point 14 illustrated in FIGS. 8 and 9. As shown in FIG. 11a, the access point 14 includes: a buffer 28 in each of the paired channels 16 for launching signals in a "forward" direction of the respective channels 16, and a simple junction between each channel and a respective access bus 24. In addition, circuit traces forming a "rearward" portion of each channel 16 are terminated (at 36) within the access point 14. This termination 36 may take the form of a connection to a fixed reference voltage (e.g., Vdd, Vss, or GND), or a connection to an input bus (not shown) of the cell 6. Of course, it will be appreciated that a combination of these termination strategies may be used. Thus, some traces may be connected to a fixed reference, while others are coupled to an input bus of the cell 6.

In the arrangement of FIG. 11a, the direction of propagation of data signals is controlled by selectively outputting the data signals through one (or both) of the access busses 24. However, this functionality comes at a cost of doubling the number of circuit traces required to couple the cell 6 to the communications bus 12. This, in turn, increases the size and complexity of data switching circuits (not shown) required in each cell 6. This problem is addressed by the arrangement of FIG. 11b.

As shown in FIG. 11b, directional control can be obtained by adding a pair of logical-AND gates 32 to the access point 14 in a manner directly analogous to that described above with reference to FIG. 10b. Thus an AND-gate 32 is located at the input of each buffer 28, so as to control propagation of data signals in the respective channel. A single access bus 24 is connected to an input of both AND-gates 32, and so simultaneously supplies data signals to both channels 16. With this arrangement, the direction of propagation of data signals is controlled by applying appropriate control signals to each AND-gate 32, as described above with reference to FIG. 10b.

At present, CMOS technology appears to afford numerous advantages for implementation of a wafer-scale parallel processing system. As is well known in the art, CMOS devices draw maximum power supply current during transitions (either up or down). Furthermore, while a perfect balance is not essential, it is generally preferable to avoid a disproportionate current load on one rail (e.g., Vdd or Vss) of the power supply. With long circuit traces (such as those anticipated in a wafer-scale integrated system) if a large number of devices (e.g., gates or buffers) transition simultaneously in a common direction, then the ground rail (GND) in the vicinity of these devices may loose ground potential, and begin to float, resulting in unreliable circuit operation. These issues are addressed using the buffering arrangement illustrated in FIGS. 12a and 12b.

Figure 12A:
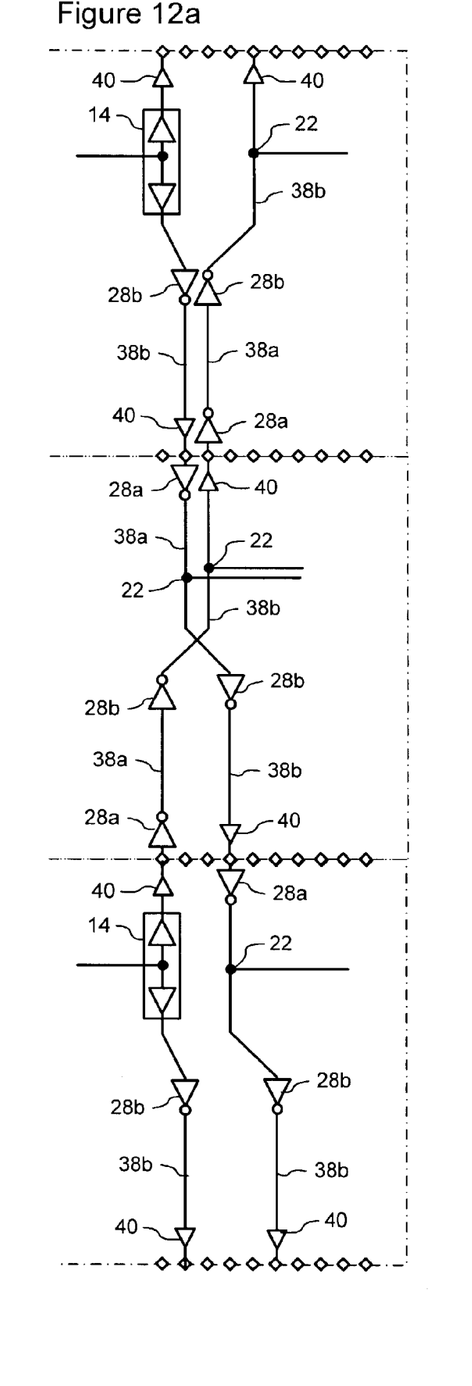
FIGS. 12a and 12b schematically illustrate buffers and logic gates deployed in a pair of channels of the communications bus of FIG. 8.

FIG. 12a is a schematic illustration showing buffers deployed in a pair of channels 16 of the communications bus of FIG. 6. It will be appreciated that the same buffering arrangement can equally be applied to the embodiments of any of FIGS. 6-9.

As shown in FIG. 12a, within each cell 6, each channel is separated into a pair of sections 38 of approximately equal length. Each section 38 is driven by a respective inverting buffer 28. Thus a first inverting buffer 28a is located close to the cell boundary and receives data signals entering the cell 6. A second inverting buffer 28b is located at about mid-span within the cell 6, and receives data signals from the first inverting buffer 28 via the first section 38a. With this arrangement, the polarity of each section 38 will always be opposite that of the adjacent sections 38, independently of the data being conveyed through the channel 16. This implies that transitions in the two inverting buffers 28 of each cell 6 will always be in the opposite sense, and these inverting buffers 28 will therefore draw current from opposite power supply rails. Dividing the channel 16 into sections 38 of approximately equal length (within each cell 6) means that the capacitance (and inductance) of each section 38 will also be approximately equal. As a result, the current draw of each inverting buffer 28 will be approximately equal, as will be transition delays (i.e., the time between when a bit is applied to the buffer 28 and the potential of the downstream section reaches its new state) in each section 38. Because currents are (approximately) balanced within each cell 6, the potential of the ground rail will have less tendency to float during transitions.

In a wafer-scale parallel processing system such as that of FIG. 1, it is preferable to divide the matrix 4 into a plurality of power domains (not shown). Each power domain has a respective power supply (Vdd, Vss, GND, and clock), and thus can operate independently of neighboring power domains. This is advantageous, in that cells 6 within one power domain can continue to operate normally, even in the presence of a power supply failure affecting a neighboring domain. In general, a power domain may encompass any desired number of cells 6. However, maximum fault tolerance is obtained by restricting each power domain to a single cell.

A problem with multiple power domains within the cell matrix 4 is that the respective potentials (e.g., of Vdd and Vss) in adjacent power domains may not be equal. When signal traces cross a domain boundary, any such potential differences result in undesired current flows, and can negatively affect signal integrity. Accordingly, it is preferable to electrically isolate the circuit traces of adjacent power domains. In the embodiment of FIG. 12, this isolation is provided by an output buffer 40 near the cell (power domain) boundary, which operates to isolate the upstream channel section 38b from the first inverting buffer 28a of the next (downstream) cell 6.

In the illustrated embodiment, this output buffer 40 is non-inverting. As is known in the art, a degree of simplification can be obtained by using an inverting buffer. However, the use of a third inverting buffer within each cell 6 will result in opposite channel polarities at the monitoring points 22 of adjacent cells. This problem is avoided by the use of either a non-inverting output buffer 40, or the combination of an inverting buffer and an inverter to achieve the same result.

As mentioned previously, various methods are known by which a cell 6 can determine an appropriate direction in which to send data signals, in order to minimize propagation delays, bus traffic and power consumption. Similarly, numerous methods are known by which a cell 6 can identify an intended recipient of a data signal. For example, a frame format can be defined in which a frame header includes an address of a recipient cell, and a frame body contains data to be transmitted to that recipient cell. With this arrangement, the recipient cell can detect when it is the intended recipient of a data signal within any channel 16 of the communications bus 12. Clearly, reductions in unnecessary bus traffic and power consumption can be obtained by terminating propagation of at least a portion of the data signal past the recipient cell.

Figure 12B:
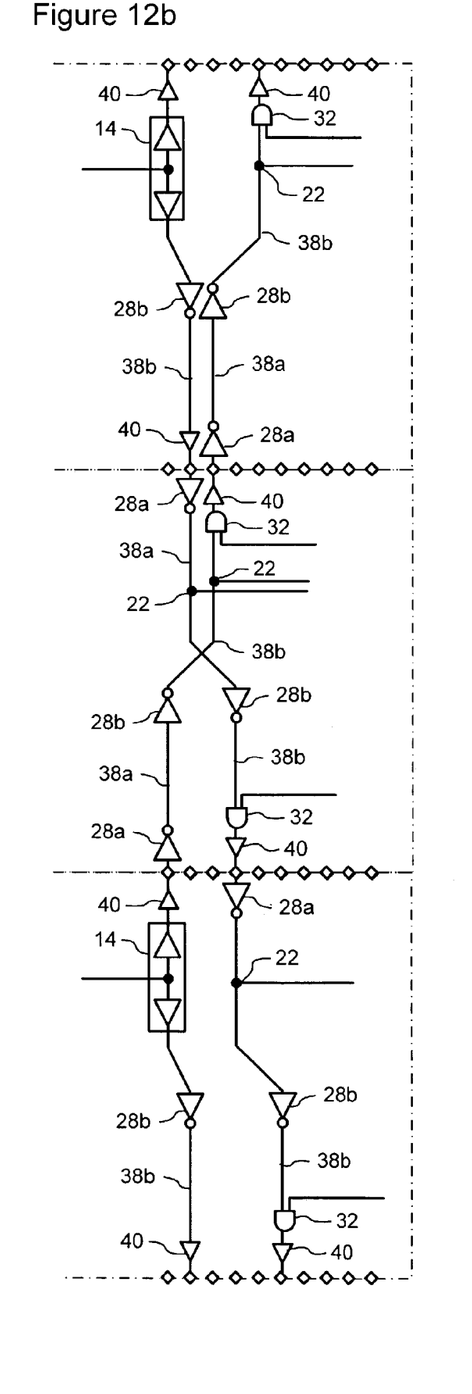

As shown in FIG. 12b, this can be accomplished by inserting an AND-gate 32 into each channel 16 downstream of its respective monitoring point 22. As a result, propagation of data signals to a next successive (downstream) cell 6 can be controlled by supplying an appropriate control signal to the AND-gate 32. With this arrangement, each cell 6 is capable of monitoring the data signals within each bundle 30 (channel 16). If the cell 6 detects that it is the intended recipient of a data signal (e.g., by detecting its address in the data signal), then it can control the appropriate downstream AND-gate 32 to terminate propagation of the data signal to the next cell 6.

Thus it will be seen that the present invention provides a communications bus of a wafer-scale parallel processing system. The communications bus includes a respective access point and a crossover point associated with each cell. Within each crossover point, the channel order of the communications bus is changed in accordance with a regular channel-weaving pattern, so that each access point is coupled to a unique one channel of the communications bus in spite of the fact that each reticle used to generate the parallel processing system contains an identical pattern of circuit traces.

The embodiments of the invention illustrated herein are in the context of a wafer-scale parallel-processing system. A person skilled in the art will readily understand that the invention can be equally practiced with other suitable substrates, and on any desired scale.

The embodiment(s) of the invention described above is(are) intended to be exemplary only. The scope of the invention is therefore intended to be limited solely by the scope of the appended claims.

We claim:

1. A communications bus of a parallel processing system having a plurality of substantially identical cells, each cell having an access point for transmitting data signals into the communications bus, comprising:
a plurality of parallel channels; and
at least one respective channel crossover point associated with each cell, each channel crossover point implementing a regular change in a channel order of the communications bus, such that each access point is coupled to a unique one of the channels of the communications bus.

2. A communications bus as claimed in claim 1, wherein the regular change in the channel order of the communications bus follows a predetermined channel-weaving pattern that is identical for each crossover point.

3. A communications bus as claimed in claim 2, wherein the channel weaving pattern defines a unique channel order of the communications bus at each access point.

4. A communications bus as claimed in claim 2, wherein each channel is adapted to carry data signals in a predetermined direction.

5. A communications bus as claimed in claim 4, wherein physically adjacent channels within the bus carry data signals in respective opposite directions.

6. A communications bus as claimed in claim 1, wherein each access point is coupled to first and second channel branches respectively adapted to carry data signals in opposite directions away from the access point.

7. A communications bus as claimed in claim 6, wherein the access point is adapted to control a direction of propagation of the data signals in the respective talker-owned channel.

8. A communications bus as claimed in claim 7, wherein the access point comprises a junction between each channel branch and a respective access bus, such that the direction of propagation of the data signals away from the access point is controlled by outputting the data signals through either one or both of the access busses.

9. A communications bus as claimed in claim 7, wherein the access point comprises a respective AND-gate disposed in each channel branch, such that the direction of propagation of the data signals away from the access point is controlled by supplying a predetermined control signal to either one or both of the AND-gates.

10. A communications bus as claimed in claim 6, wherein the first and second channel branches are defined by respective portions of a common talker-owned channel of the communications bus.

11. A communications bus as claimed in claim 6, wherein each of the first and second channel branches are defined by a respective portion of first and second talker-owned channels of the communications bus.

12. A communications bus as claimed in claim 11, wherein each one of the first and second talker-owned channels comprises:
an active portion defining the respective channel branch and adapted to carry data signals sourced from the associated cell; and
an inactive portion.

13. A communications bus as claimed in claim 12, wherein the inactive portion is terminated proximal the access point.

14. A communications bus as claimed in claim 12, wherein the inactive portion is adapted to carry inbound signals destined for the associated cell.

15. A communications bus as claimed in claim 1, wherein each channel comprises a buffer associated with each cell.

16. A communications bus as claimed in claim 15, wherein each channel comprises a pair of inverting buffers associated with each cell, each inverting buffer being adapted to drive a respective portion of the channel.

17. A communications bus as claimed in claim 16, wherein the respective portions have similar lengths.

18. A communications bus as claimed in claim 15, wherein each channel further comprises an output buffer disposed proximal a downstream cell boundary.

19. A communications bus as claimed in claim 1, wherein each channel comprises a monitor point associated with each cell, the monitor point being coupled to an input bus of the cell, such that data traffic in the channel can be monitored by the cell.

20. A communications bus as claimed in claim 19, further comprising an AND-gate disposed in each channel downstream of the monitor point, such that propagation of data signals to an adjacent cell downstream of the monitor point can be controlled by supplying a predetermined control signal to the AND-gate.

21. A parallel processing system having a plurality of substantially identical reticles, each reticle encompassing at least one cell and a respective access point for coupling each cell to a channel of a multichannel communications bus, the parallel processing system comprising:

at least one respective channel crossover associated with each cell, each channel crossover implementing a regular change in a channel order of the communications bus, such that the respective access point of each cell is coupled to a unique channel of the communications bus.

22. A system as claimed in claim 21, wherein the regular change in the channel order of the communications bus follows a predetermined channel-weaving pattern that is identical for each crossover point.

23. A system as claimed in claim 22, wherein the channel weaving pattern defines a unique channel order of the communications bus at each access point.

24. A system as claimed in claim 22, wherein each channel is adapted to carry data signals in a predetermined direction.

25. A system as claimed in claim 24, wherein physically adjacent channels within the bus carry data signals in respective opposite directions.

26. A system as claimed in claim 21, wherein each access point is coupled to first and second channel branches respectively adapted to carry data signals in opposite directions away from the access point.

27. A system as claimed in claim 26, wherein the access point is adapted to control a direction of propagation of the data signals in the respective talker-owned channel.

28. A system as claimed in claim 27, wherein the access point comprises a junction between each channel branch and a respective access bus, such that the direction of propagation of the data signals away from the access point is controlled by outputting the data signals through either one or both of the access busses.

29. A system as claimed in claim 27, wherein the access point comprises a respective AND-gate disposed in each channel branch, such that the direction of propagation of the data signals away from the access point is controlled by supplying a predetermined control signal to either one or both of the AND-gates.

30. A system as claimed in claim 26, wherein the first and second channel branches are defined by respective portions of a common talker-owned channel of the communications bus.

31. A system as claimed in claim 26, wherein each of the first and second channel branches are defined by a respective portion of first and second talker-owned channels of the communications bus.

32. A system as claimed in claim 31, wherein each one of the first and second talker-owned channels comprises:

an active portion defining the respective channel branch and adapted to carry data signals sourced from the associated cell; and an inactive portion.

33. A system as claimed in claim 32, wherein the inactive portion is terminated proximal the access point.

34. A system as claimed in claim 32, wherein the inactive portion is adapted to carry inbound signals destined for the associated cell.

35. A system as claimed in claim 21, wherein each channel comprises a buffer associated with each cell.

36. A system as claimed in claim 35, wherein each channel comprises a pair of inverting buffers associated with each cell, each inverting buffer being adapted to drive a respective portion of the channel.

37. A system as claimed in claim 36, wherein the respective portions have similar lengths.

38. A system as claimed in claim 35, wherein each channel further comprises an output buffer disposed proximal a downstream cell boundary.

39. A system as claimed in claim 21, wherein each channel comprises a monitor point associated with each cell, the monitor point being coupled to an input bus of the cell, such that data traffic in the channel can be monitored by the cell.

40. A system as claimed in claim 39, further comprising an AND-gate disposed in each channel downstream of the monitor point, such that propagation of data signals to an adjacent cell downstream of the monitor point can be controlled by supplying a predetermined control signal to the AND-gate.

* * * * *